US007038217B2

(12) United States Patent
Yamada et al.

(10) Patent No.: US 7,038,217 B2
(45) Date of Patent: May 2, 2006

(54) METHOD AND APPARATUS FOR GENERATION OF MOLECULAR BEAM

(75) Inventors: Toshiki Yamada, Tokyo (JP); Hidenori Shinohara, Tokyo (JP); Shinro Mashiko, Tokyo (JP); Katsumi Kimura, Nagoya (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 0 days.

(21) Appl. No.: 11/104,443

(22) Filed: Apr. 13, 2005

(65) Prior Publication Data

US 2005/0199824 A1 Sep. 15, 2005

Related U.S. Application Data

(62) Division of application No. 10/299,658, filed on Nov. 20, 2002, now Pat. No. 6,906,323.

(30) Foreign Application Priority Data

Mar. 5, 2002 (JP) ............................ 2002-059167
Sep. 13, 2002 (JP) ............................ 2002-268053

(51) Int. Cl.
*B01D 59/44* (2006.01)

(52) U.S. Cl. .................... 250/424; 250/288; 250/423 F

(58) Field of Classification Search ................ 250/251, 250/423 R, 423 P, 424, 425, 423 F
See application file for complete search history.

(56) References Cited

U.S. PATENT DOCUMENTS 4,201,913 A 5/1980 Bursack et al.
4,449,820 A 5/1984 Koizumi et al.
4,988,879 A 1/1991 Zare et al.
5,055,696 A 10/1991 Haraichi et al.
5,062,935 A 11/1991 Schlag et al.
5,118,937 A 6/1992 Hillenkamp et al.
5,221,841 A 6/1993 Nagai et al.
5,285,064 A 2/1994 Willoughby
5,288,644 A 2/1994 Beavis et al.
5,345,079 A 9/1994 French et al.
5,382,793 A 1/1995 Weinberger et al.
5,480,809 A 1/1996 Salin et al.
5,498,545 A 3/1996 Vestal (Continued)

*Primary Examiner*—Nikita Wells
*Assistant Examiner*—David A. Vanore
(74) *Attorney, Agent, or Firm*—Birch, Stewart, Kolasch & Birch, LLP

(57) ABSTRACT

Here is disclosed a method for generation of a molecular beam from a sample solution, comprising steps of operating a spray-in device to introduce the sample solution in atomized state into a spray chamber, impinging a suitable gas on the sample solution in atomized state or heating the sample solution in atomized state to generate solute molecules deprived of solvent molecules, and then ejecting these solute molecules through an orifice into a low air pressure chamber. The apparatus as well as the method according to the present invention enable to generate a molecular beam for a variety of molecules, particularly for the neutral molecules which can be decomposed by heating at a high temperature or those which can not be sublimated or vaporized even by heating at a high temperature, as long as the sample solutions are prepared. Due to the method as well as the apparatus according to the invention, it is possible to conduct the mass spectroscopy studies and also other spectroscopic analyses about the molecules and the molecular clusters containing in the molecular beam generated in this manner, for example, by irradiating laser beams. It is possible to also possible to deposit the molecules on a substrate.

9 Claims, 4 Drawing Sheets

U.S. PATENT DOCUMENTS

| | | | | |
|---|---|---|---|---|
| 5,589,685 | A | 12/1996 | Jen Wu et al. | |
| 5,594,243 | A | 1/1997 | Weinberger et al. | |
| 5,770,152 | A | 6/1998 | Schuster et al. | |
| 5,770,272 | A | 6/1998 | Biemann et al. | |
| 5,821,548 | A | 10/1998 | Hinchliffe | |
| 5,861,623 | A | 1/1999 | Park | |
| 5,939,718 | A | 8/1999 | Yamada et al. | |
| 5,969,352 | A | 10/1999 | French et al. | |
| 6,043,031 | A | 3/2000 | Koster et al. | |
| 6,049,077 | A | 4/2000 | Franzen | |
| 6,051,287 | A | 4/2000 | Marsh | |
| 6,057,543 | A | 5/2000 | Vestal et al. | |
| 6,111,251 | A | 8/2000 | Hillenkamp | |
| 6,143,085 | A | 11/2000 | Marsh | |
| 6,146,854 | A | 11/2000 | Koster et al. | |
| 6,175,112 | B1 | 1/2001 | Karger et al. | |
| 6,187,392 | B1 | 2/2001 | Marsh | |
| 6,194,144 | B1 | 2/2001 | Koster | |
| 6,197,498 | B1 | 3/2001 | Koster | |
| 6,265,717 | B1 | 7/2001 | Sakata et al. | |
| 6,281,493 | B1 | 8/2001 | Vestal et al. | |
| 6,294,790 | B1 | 9/2001 | Weinberger | |
| 6,337,479 | B1 | 1/2002 | Kley | |
| 6,383,953 | B1 | 5/2002 | Hwang | |
| 6,390,115 | B1 | 5/2002 | Rohwer et al. | |
| 6,465,776 | B1 | 10/2002 | Moini et al. | |
| 6,485,689 | B1 | 11/2002 | Huang et al. | |
| 6,566,652 | B1 | 5/2003 | Kato | |
| 6,586,731 | B1 | 7/2003 | Jolliffe | |
| 6,627,880 | B1 | 9/2003 | Goodley et al. | |
| 6,639,215 | B1 | 10/2003 | Takada et al. | |
| 6,906,323 | B1 * | 6/2005 | Yamada et al. | 250/288 |
| 2003/0015657 | A1 | 1/2003 | Takada et al. | |
| 2003/0168592 | A1 | 9/2003 | Yamada et al. | |

* cited by examiner

METHOD AND APPARATUS FOR GENERATION OF MOLECULAR BEAM

This application is a Divisional of application Ser. No. 10/299,658, filed on Nov. 20, 2002, now U.S. Pat. No. 6,906,323 and for which priority is claimed under 35 U.S.C. § 120; and this application claims priority of application Ser. Nos. 2002-268053 and 2002-059167 filed in Japan on Sep. 13, 2002 and Mar. 5, 2002 under 35 U.S.C. § 119; the entire contents of all are hereby incorporated by reference.

TECHNICAL BACKGROUND

The present invention relates to a method to generate a neutral molecular beam of sample molecules by multistage spraying of the sample solution and further to an apparatus that actualizes this method.

The conventional method for generating a molecular beam comprises steps of: mixing gaseous sample molecules with rare gas atoms; introducing the mixed gas through a nozzle directly into vacuum where the mixed gas is adiabatically expanded to form a supersonic jet flow; and guiding this supersonic jet flow through a skimmer to form a molecular beam. For a sample in form of liquid or solid, the method similar to what described above for the gaseous sample is carried out after heating the sample so as to vaporize or to sublime.

The sample molecules in the supersonic jet flow are adiabatically expanded in vacuum, so that they are cooled at a temperature of several Kelvins for rotation and at a temperature of several dozens of Kelvins for vibration. Consequently, the sample molecules occupy the ground states and therefore a rotational energy distribution of the sample molecules is simplified.

FIG. 3 illustrates an example of the conventional method. A mixed gas (32) composed of gaseous sample molecules and rare gas atoms is ejected through an orifice (34) from a mixed gas reservoir (33) into a vacuum chamber in which the mixed gas is to be adiabatically expanded. The mixed gas in form of a supersonic jet flow is then guided through a skimmer (35) to generate the molecular beam (36). Shock waves, such as Barrel shock wave and Mach disc shock wave, are generated as the mixed gas (32) is ejected through the orifice (34) or the nozzle.

For a liquid or solid sample, the method similar to what is previously described is employed after heating the sample so as to vaporize or to sublime. Thus the mixed gas forms the supersonic jet flow. In this case, the sample is adiabatically expanded, and consequently, the molecules are cooled. In this way, the rotational energy distribution of the sample molecules is remarkably simplified and the spectroscopic structures of the sample molecules are correspondingly simplified. In this point of view, such a method is suitable for quantitative as well as qualitative analysis.

There is another well-known method, which comprises steps as follows: spraying a sample in form of an ionic solution into atmosphere; impinging a large quantity of nitrogen gas on the sample mist to strip solvent molecules; introducing the solute ions into vacuum by applying an electric field so as to generate an ion beam, prior to measure the mass of the ions. According to this method, a capillary is combined with skimmer(s), and a differential pumping is applied to achieve high vacuum in a mass detection region located in downstream of the ion beam flow. In this way, a continuous ion molecular beam is obtained.

However, the first conventional method for generation of a molecular beam is ineffective for a liquid or solid sample with a high molecular weight. For examples, most of the protein molecules can be decomposed at a high temperature and most of polymer molecules cannot be sublimated or vaporized even at a high temperature.

The second conventional method to produce an ion beam is ineffective for neutral molecules, as it can be applied only for ionized molecules. The term "neutral molecules" used herein refers to non-ionic molecules.

In view of the problems as have been described above, it is a principal object of the present invention to provide a brand-new method and an apparatus to generate a neutral molecular beam. The apparatus as well as the method described in the present invention enable to generate a molecular beam for a wide variety of molecules, particularly for the molecules which can be decomposed by heating at a high temperature or those which can not be sublimated or vaporized even at high temperature. In addition, with the method as well as the apparatus described in the present invention, it is possible to photo-ionize the neutral molecules and the inclusion cluster contained in the neutral molecular beam produced in this manner, for example, by irradiating with laser beams and thereby to carry out the mass spectroscopy studies and other spectroscopic analyses.

DISCLOSURE OF THE INVENTION

According to the present invention, the object set forth above is achieved by a method and an apparatus for generation of a molecular beam, comprising the features as will be described.

The present invention provides an apparatus for generation of a neutral molecular beam from a sample solution. The sample inlet system of this apparatus comprise of two-combined introduction devices and a spray chamber, so there are two introduction means. The first introduction device using a spray-in device introduces the sample solution in an atomized state through an orifice into a spray chamber. In the spray chamber, the sample solution particles are impinged with a suitable gas delivered to the spray chamber to generate the solute molecules apart from the solvent molecules, while the second introduction device introduces the solute molecules into the low air pressure chamber through an orifice. The spray chamber can be heated to generate solute molecules apart from solvent molecules.

The first introduction device may be provided either with a pulsed nozzle which is adapted to open the orifice in a pulsed fashion to introduce the sample solution into the spray chamber repetitively in increments of a short period, or may be provided with an ultrasonic nebulizer which is adapted to atomize the sample solution by an ultrasonic vibration and to introduce the atomized sample solution into the spray chamber repetitively in increments of a short period or continuously.

The orifice of the second introduction device may have a diameter of 0.1–3 mm. The orifice may be opened for a duration time of 100 μs–10 ms with a cycle period of 20 ms–1s.

The low air pressure chamber may be divided into two or more compartments by skimmers so that a degree of vacuum progressively increases from the upstream compartment toward the downstream compartment along the flow of the molecular beam and the respective compartments having orifices for passage of the molecular beam may be independently evacuated with a differential pumping. The present invention is primarily characterized in that two introduction devices are combined. With such an arrangement, after the sample solution have been directly atomized by a suitable atomizer or a spray-in device, an inert gas such as rare gas or nitrogen gas may be impinged on the atomized sample solution to strip the solvent molecules such as water, alcohol, acetone or chloroform from the solution particles, i.e., those solvent molecules are removed from the sample molecules as completely as possible. Then, these sample molecules may be introduced through the orifice into the vacuum chamber to generate a supersonic molecular beam.

Based on the primary features of the invention, the low air pressure chamber may be equipped with an introduction device of a substrate to be processed and viewing-ports for observation of the substrate to be processed.

As has already been described, the sample molecules in the molecular beam fly at a high and uniform speed. In this point of view, a substrate such as glass may be located on the path of such a molecular beam and then be processed by the sample molecular beam. Thus the sample molecules. are deposited on the substrate's surface. Compared to the conventional spin coating process, such a deposition method facilitates a film preparation and improves the film quality. A holder to hold the substrate may be equipped with a heating unit.

The apparatus may further be equipped with irradiation light sources adapted to photo-ionize the sample molecules on the path of the molecular beam and a mass spectrometer adapted to accelerate the photo-ionized sample molecules under applied electric fields and then to analyze mass of the accelerated sample molecule ions.

Finally, the spray chamber may be equipped with exhausts through which the deprived solvent can be exhausted.

Figure 1:
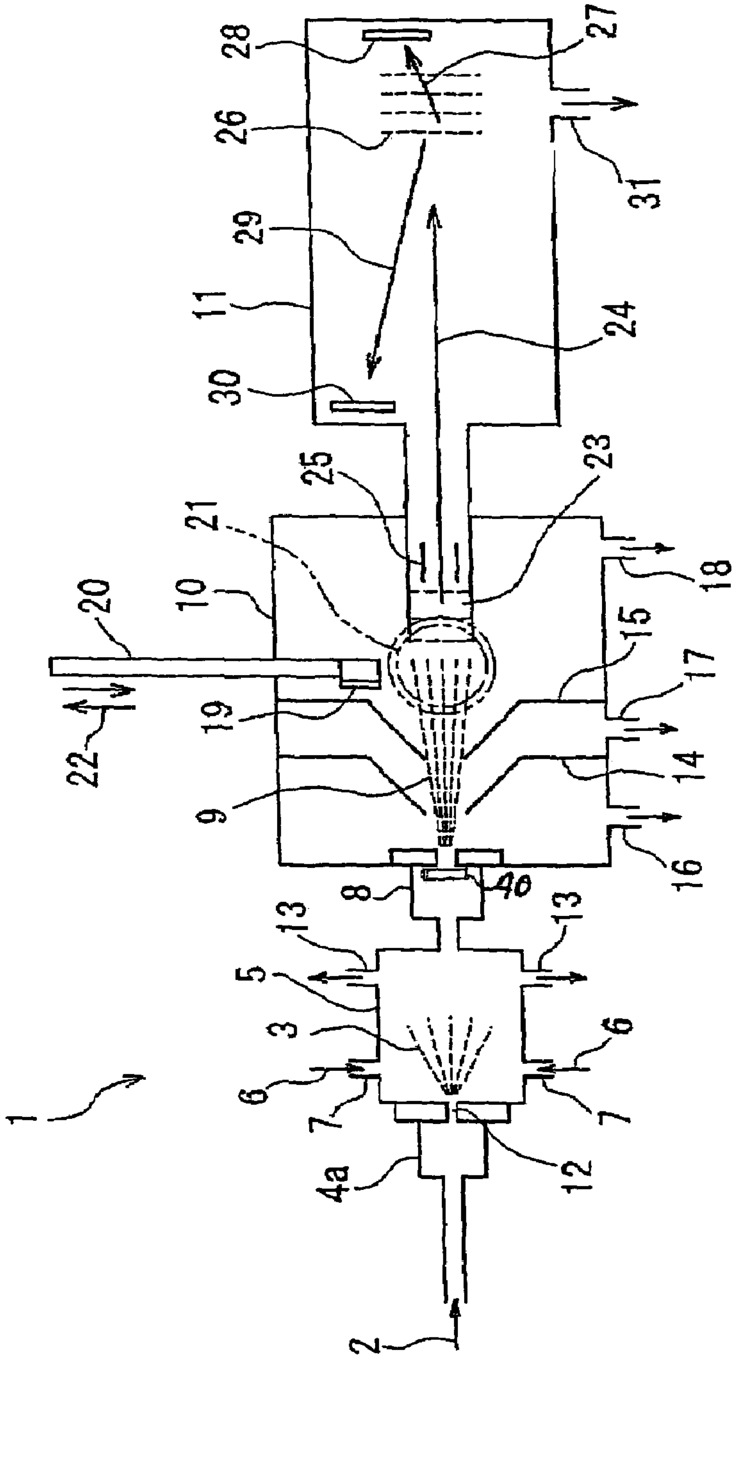
FIG. 1 is a diagram illustrating an apparatus to generate a neutral molecular beam according to the invention.

Identification of reference numerals used in the drawings is as follows;

1: apparatus for generation of a sample molecular beam,
2: sample solution,
3: atomized sample solution,
4*a*: first introduction device,
4*b*: another type of first introduction device,
5: spray chamber,
6: inert gas,
7: inert gas inlets,
8: second introduction device,
9: sample molecular beam,
10: vacuum chamber equipped with a substrate introduction device,
11: mass spectrometer,
12: nozzle,
13: exhausts,
14–15: skimmers,
16–18: exhausts for vacuum pumping,
19: substrate to be processed,
20: substrate introduction device,
21: viewing-ports,
22: substrate transfer,
23: accelerate grids for photo-ionized ions
24, 27: photo-ionized ions
25: steering plates
26: reflector,
28, 30: micro channel plates (MCPs),
29: ions after a reflection,
31: exhaust for a vacuum pumping,
32: mixed gas,
33: gas reservoir,
34: orifice,
35: skimmer,
36: sample molecular beam,
37: Barrel shock,
38: Mach disc shock.

DETAILED DESCRIPTION OF THE INVENTION

Figure 2:
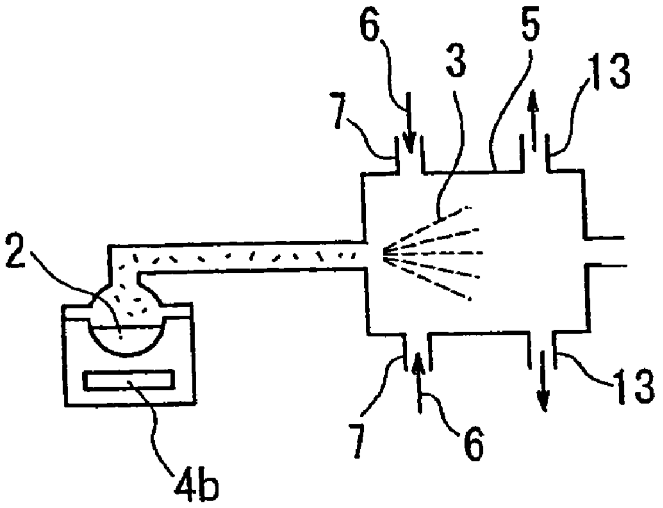
FIG. 2 is a diagram illustrating one preferred embodiment of the first introduction device.
Figure 3:
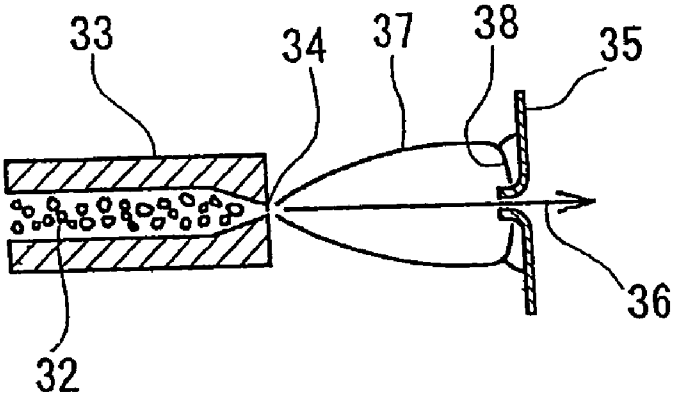
FIG. 3 is a diagram illustrating the principle of a conventional supersonic molecular beam.

The manner in which the present invention is implemented will be described in reference with the accompanying drawings. FIG. 1 is a diagram illustrating an apparatus to generate a neutral molecular beam according to the invention and FIG. 2 is a diagram illustrating one preferred embodiment of the first introduction device.

A sample solution (2) used in this apparatus (1) may be a liquid solution obtained by dissolving a solid sample in an appropriate solvent or a previously liquefied sample such as protein.

The apparatus for generation of a sample molecular beam (1) comprises the first introduction device (4*a*, 4*b*), a spray chamber (5), an inert gas inlet (7), the second introduction device (8) and a vacuum chamber (10). The apparatus may additionally be equipped with a substrate introduction device (20) and a mass spectrometer (11). The spray chamber (5) may be equipped with a heating unit.

The first introduction device (4*a*) is adapted to spray a sample solution (2) in a pulsed fashion at a short cycle so as to make an atomized sample solution (3). As one preferred embodiment of the first introduction device, a pulsed nozzle may be adopted, having an orifice that is opened at a cycle of 1–100 ms so as to inject the sample solution of 1–10 μl at each cycle. On downstream of the first introduction device (4), there is a pulsed nozzle (12) that has a shutter (not shown) serving to open and close an orifice of this nozzle (12). The pulsed nozzle (12) is driven by in a pulsed fashion so as to spray the sample solution (2) under a stagnation pressure into the spray chamber (5) approximately at 1 atmospheric pressure and thereby the atomized sample solution (3) may be produced.

The atomized sample solution (3) is produced in a pulsed fashion by the first introduction device (4*a*). Thus, the fine solution particles or the ultra-fine solution particles with a high concentration are produced.

As another type of the first introduction device (4*b*), an ultrasonic nebulizer that can be driven in a continuous or pulsed fashion is adopted. Thereby the atomized sample solution (3) produced by the ultrasonic spray is introduced into the spray chamber (5) approximately at 1 atmospheric pressure. The atomized sample solution (3) is in the state of the fine solution particles or the ultra-fine solution particles with a high concentration. It should be understood that the first introduction device is not limited to that as has been described just above and may be appropriately selected from those of well-known methods.

An inert gas (6) is introduced into the spray chamber (5) through the inert gas inlets (7) and repetitively impinges on the atomized sample solution (3) and strips solvent molecules from the fine particles. The spray chamber (5) is equipped with a heating unit so that the heating effect also may strip solvent molecules from the fine particles. It may be preferable to combine both of these two methods for the deprivation of solvent molecules.

More specifically, this spray chamber (5) is a cylindrical chamber having a length of 15 cm and a diameter of 1.5 cm. The spray chamber (5) is equipped with one or more inlets (7) for the introduction of an inert gas such as nitrogen gas. The chamber (5) is further equipped with exhausts (13) for the solvent molecules stripped from the fine particles.

The sample molecules are injected in a pulsed fashion of a short cycle period through the second introduction device (8) and through the orifices located on its downstream in the vacuum chamber, which results in a sample molecular beam. Here is also adopted a pulsed nozzle (40) having an orifice which has an opening duration of 100 μs–10 ms and has a cycle period of 20 ms–1 s. The cycle may be set as short as possible to minimize the change of vacuum possibly occurring within the vacuum chamber. A sample molecular beam (9) injected from the second introduction device (8) may be used to process a substrate. It is also possible to irradiate the sample molecular beam (9) with laser beams or the like to photo-ionize or excite the sample molecules and thereby conduct the mass spectroscopy studies of the photo-ionized ions by a time-of-flight mass spectrometer (11) or other spectroscopic analyses.

As will be apparent from the foregoing description, the method and the apparatus according to the invention for generation of a sample molecular beam enable it at a room temperature to generate a neutral molecular beam for various kinds of molecules, particularly for the molecules which can be easily decomposed under a heating condition at a high temperature or for the molecules which can not be sublimated or vaporized even under a heating condition at a high temperature.

The sample molecules introduced into the vacuum chamber (10) are adiabatically expanded so as to make a cooled supersonic molecular beam. The flight velocity of those molecules is unified due to the repetitive intermolecular collisions. The cooled molecular beam is suitable for qualitative as well as quantitative analysis of these sample molecules.

The vacuum chamber maintains high vacuum by a differential pumping using 70 L/s turbo molecular pump, 800 L/s turbo molecular pump and a rotary pump serving as an auxiliary pump. According to the present embodiment, the vacuum chamber (10) is divided into three compartments by skimmers (14,15) (See FIG. 1). The vacuum within the respective compartments becomes better toward the downstream side of the molecular beam. Partitions of these compartments have orifices through which the sample molecular beam (9) can pass. The upstream compartment is maintained less than $1.00\times10^{-3}$ Torr (background pressure). The respective compartments are equipped with the exhausts (16, 17, 18) for a differential pumping.

The high vacuum chamber (10) is equipped with a substrate introduction device (20) for a substrate to be processed (19). The substrate to be processed (19) is located on the path of the molecular beam (9) to deposit the sample molecules. The substrate holder may have a heating unit. The high vacuum chamber (10) is equipped with viewing-ports (21) so that the position of the substrate to be processed (19) may be observed. Reference numeral (22) stands for a direction for the transfer of the substrate to be processed (19).

Now it is described about a time-of-flight mass spectrometer (11), which may be equipped in the downstream side of the vacuum chamber (10). The time-of-flight mass spectrometer has grids (23) to accelerate the photo-ionized ions (24) after a photo-irradiation of the neutral molecular beam (9), steering plates (25) for these ions (24), and a micro-channel plate (referred to hereinafter simply as MCP) (28) to detect the ions. The time-of-flight mass spectrometer also has another MCP (30) to detect the reflected ions (29) by a reflector (26).

The interior of the time-of-mass spectrometer (11) is also evacuated by a 70 L/s turbo pump and a rotary pump serving as an auxiliary pump to maintain the interior of the mass spectrometer (11) at high vacuum around $1.00\times10^{-8}$ Torr (background pressure) to successfully perform the mass spectroscopy studies.

High voltage is applied to the grids (23) to accelerate the photo-ionized ions (24) after a photo-irradiation of the neutral molecular beam (9).

The photo-ionized ions (27) impinge upon the MCP (28), where the MCP (28) converts them to voltage signals. Thereby the voltage signals can be used to determine the flight time of the ions. It is also possible to determine the flight time of the reflected ions (29) using the time-of-flight method.

Figure 4:
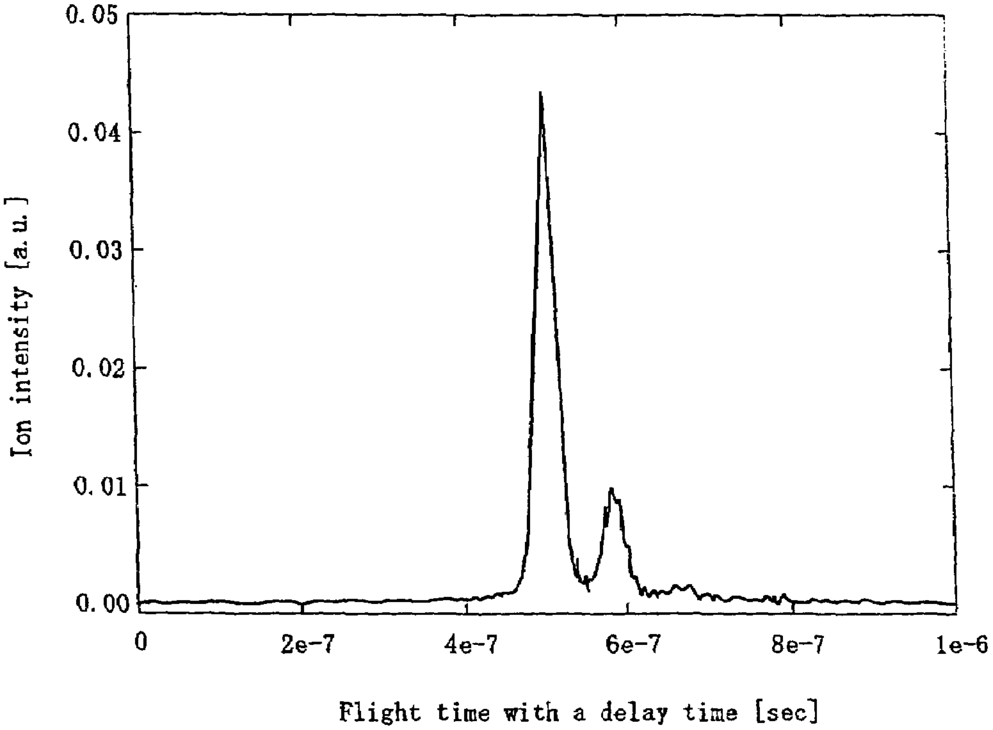
FIG. 4 is a graphic diagram indicating a mass spectrum obtained for a molecular beam produced with an apparatus according to the present invention. An acetone solution of 4'-n-pentyl-4-cyanobiphenyl (10 mM) is used as a sample solution. Isotopes of 4'-n-pentyl-4-cyanobiphenyl are discriminated in this figure.

FIG. 4 is a graphic diagram indicating an example of a mass spectrum obtained for a neutral molecular beam produced with a present invention. An acetone solution of 4'-n-pentyl-4-cyanobiphenyl (10 mM) was used as the sample solution (2) to perform the mass spectroscopy studies for 4'-n-pentyl-4-cyanobiphenyl. In the graphic diagram, the abscissa indicates the flight time and the ordinate indicates the signal intensity. A significant peak is due to 4'-n-pentyl-4-cyanobiphenyl without $^{13}C$ and a relatively small peak is due to 4'-n-pentyl-4-cyanobiphenyl containing one $^{13}C$. As will be apparent from this figure, even such a slightly different mass can be distinguished.

Based on said flight time, the mass of the ions is determined. The ionization energy can be determined from the photon energy necessary for the photo-ionization, which can be controlled by changing the wavelengths of the laser beams.

It is also possible to perform various kinds of spectroscopy studies such as ion mass spectroscopy, photoelectron spectroscopy, and laser-induced fluorescence spectroscopy for a neutral molecular beam produced by the present invention.

EXAMPLES

Details of the method and the apparatus according to the present invention for generation of a molecular beam of sample molecules from a sample solution will be more fully understood from the following description or preferred embodiments.

Example 1

In the apparatus (1) for generation of a molecular beam of sample molecules from a sample solution as illustrated by FIG. 1, a solution of functional molecules was used as the sample solution (2) to generate a molecular beam of the functional molecules. A substrate such as silicon was used as the one to be processed (19) and the substrate was located on the path of the molecular beam of said functional molecules so that the functional molecules can be deposited on the substrate. In this manner, an electronic device was made.

Example 2

A pulsed laser was applied to irradiate a molecular beam of the sample molecules (9) through the viewing-ports (21) of the high vacuum chamber (10) in the apparatus (1) as illustrated by FIG. 1. The molecular beam of the sample molecules (9) is cooled to extremely low temperatures due to the adiabatic expansion, resulting the distributions of the rotational states and the vibrational states are simplified. It is possible to obtain spectroscopic information by irradiating the cooled molecular beam with the laser beam.

Example 3

A substrate was located on the path of the molecular beam of the functional molecules used in Example 1 to deposit them on the substrate. After the deposition, a pulsed laser was applied to irradiate the functional molecules deposited on the substrate (9) through the viewing-ports (21) of the high vacuum chamber (10) in the apparatus (1) as illustrated by FIG. 1, in order to investigate an electronic structure of the functional molecules on the substrate.

Example 4

Within the vacuum chamber (10) of the apparatus (1) as illustrated in FIG. 1, another molecular beam source was provided. With such an arrangement, a collision between the sample molecular beam (9) and another molecular beam caused the chemical reaction.

EFFECT OF THE INVENTION

The present invention enables to generate a molecular beam from a sample solution of wide range of molecules at a room temperature, particularly for the neutral molecules which can be easily decomposed by heating at a high temperature or the neutral molecules which can not be sublimated or vaporized by heating at a high temperature, as long as the sample solution can be prepared. The sample molecules and the inclusion cluster contained in the neural molecular beam can be excited or photo-ionized, for example, by using laser beams. Therefore it is possible to perform the mass spectroscopy studies and other spectroscopic analyses. It is also possible to deposit the neutral molecules on a substrate located on the path of the neutral molecular beam.

What is claimed is:

1. An apparatus for generation of a molecular beam of sample molecules by an ejection of said sample molecules through an orifice into a low air pressure chamber, said apparatus comprising:

first introduction device using a spray-in device to introduce said sample solution in an atomized state into a spray chamber;

means to impinge a suitable gas on the atomized solution of said sample introduced by said first introduction device, which generates solute molecules stripped from solvent molecules; and second introduction device having an orifice which opens intermittently to generate a pulsed molecular beam by ejecting said solute molecules into said low air pressure chamber to adiabatically expand said sample molecules and make a supersonic molecular beam.

2. The apparatus for generation of a molecular beam as defined by claim 1, wherein said first introduction device is provided with a pulsed nozzle adapted to open said orifice in a pulsed fashion and thereby to introduce a sample solution repetitively in increments of a short period.

3. The apparatus for generation of a molecular beam as defined by claim 1, wherein said first introduction device is provided with an ultrasonic nebulizer adapted to atomize the sample solution by an ultrasonic vibration and to introduce such an atomized sample solution repetitively in increments of a short period or continuously.

4. The apparatus for generation of a molecular beam as defined by claim 1, wherein the orifice of said second introduction device has a diameter of 0.1–3 mm and is controlled to be opened for a duration of 100 μs–10 ms with a cycle period of 20 ms–1 s.

5. The apparatus for generation of a molecular beam as defined by claim 1, wherein said low air pressure chamber is divided into two or more compartments so that a degree of vacuum progressively increases from the upstream compartment toward the downstream compartment along the flow of the molecular beam and the respective compartments having orifices for a passage of the molecular beam are independently evacuated by a differential pumping.

6. The apparatus for generation of a molecular beam as defined by claim 1, wherein said low air pressure chamber is equipped with an introduction device of a substrate to be processed with the molecular beam and with viewing-ports for observation of the substrate introduced into said chamber.

7. The apparatus for generation of a molecular beam as defined by claim 1, further including a photo-irradiation means adapted to photo-ionize the sample molecules on a path of the molecular beam and a mass spectrometer adapted to accelerate the ionized sample molecules under an electric field and to analyze mass of the sample ions.

8. The apparatus for generation of a molecular beam as defined by claim 1, wherein the spray chamber is equipped with exhausts through which the solvent molecules deprived from the solute molecules are exhausted.

9. A method for generation of a molecular beam of sample molecules by an ejection of said sample molecules through an orifice into a low air pressure chamber, said method comprising steps of:

operating a spray-in device to introduce said sample solution in atomized state into a spray chamber;

impinging a suitable gas on said sample solution introduced in an atomized state and thereby generating solute molecules deprived of solvent molecules; and ejecting said solute molecules into said low air pressure chamber through an orifice which opens intermittently to generate a pulsed molecular beam chamber to adiabatically expand said sample molecules and make a supersonic molecular beam.

* * * * *